US008667836B2

(12) United States Patent
Yu et al.

(10) Patent No.: US 8,667,836 B2
(45) Date of Patent: Mar. 11, 2014

(54) ANTI-INTERFERENCE ANTENNA OF A WIRELESS TIRE PRESSURE RECEIVER

(75) Inventors: Hung-Chih Yu, Taichung (TW); Feng-Yi Chang, Taichung (TW)

(73) Assignee: Orange Electronic Co., Ltd., Taichung (TW)

( * ) Notice: Subject to any disclaimer, the term of this patent is extended or adjusted under 35 U.S.C. 154(b) by 428 days.

(21) Appl. No.: 13/065,456

(22) Filed: Mar. 22, 2011

(65) Prior Publication Data

US 2012/0241213 A1 Sep. 27, 2012

(51) Int. Cl.
*B60C 23/02* (2006.01)

(52) U.S. Cl.
USPC ........................................................ 73/146.5

(58) Field of Classification Search
USPC ................................................ 73/146–146.8
See application file for complete search history.

(56) References Cited

U.S. PATENT DOCUMENTS

| | | | | |
|---|---|---|---|---|
| 1,961,859 | A | | 6/1934 | Huth |
| 5,317,327 | A | * | 5/1994 | Piole ............................ 343/725 |

FOREIGN PATENT DOCUMENTS

| | | | | |
|---|---|---|---|---|
| CN | 102201612 | A | * | 9/2011 |
| EP | 2085977 | A1 | | 8/2009 |
| GB | 2456383 | | | 7/2009 |
| JP | 2006025261 | | | 1/2006 |
| JP | 2012172391 | A | * | 9/2012 |
| JP | 2012172392 | A | * | 9/2012 |
| JP | 2012193583 | A | * | 10/2012 |

* cited by examiner

*Primary Examiner* — Andre Allen
(74) *Attorney, Agent, or Firm* — William E. Pelton, Esq; Cooper & Dunham LLP

(57) ABSTRACT

An anti-interference antenna of a wireless tire pressure receiver has an insulating cable having a main casing and a sub-casing connected side by side with the main casing. The main casing has a power cable longitudinally mounted through the main casing. The sub-casing has an antenna longitudinally mounted through the sub-casing. As the antenna is individually sleeved by the insulating sub-casing, the antenna and the power cables are isolated to prevent from interfering with each other. Besides, the insulating cable further has at least one air channel longitudinally formed through the corresponding cable and mounted with a metal layer on an inner wall of the air channel, around the power cable, around each of power wires in the power cable, or around the power cable and the air channel, and filled with an EMI-shielding matter to further isolate the antenna and the power cables.

22 Claims, 12 Drawing Sheets

ANTI-INTERFERENCE ANTENNA OF A WIRELESS TIRE PRESSURE RECEIVER

BACKGROUND OF THE INVENTION

1. Field of the Invention

The present invention is related to an anti-interference antenna of a wireless tire pressure receiver, and more particularly to an antenna integrated into a power cable of the wireless tire pressure receiver, having electromagnetic interference shielding (EMI-shielding) against interference from power wires in the power cable.

2. Description of the Related Art

Tires are critical parts of vehicles. Contact between a road surface and a vehicle is through tires. Functions of tires are to absorb shocks caused by irregularities of the road surface by means of air pressure and to provide good traction to the road surface. Abnormal tire pressure arising from underinflation, air leakage or overinflation, fails to secure the functions of tires and what is worse could be life-threatening to drivers and passengers.

Therefore, constant monitoring of tire pressure is a must for ensuring that tires are under proper working conditions. To facilitate drivers constantly monitoring tire pressure of tires of vehicles, each tire of new vehicles is equipped with a wireless tire pressure meter periodically and wirelessly transmitting detected tire pressure to a wireless tire pressure receiver inside the vehicles. By means of the analysis and display of the wireless tire pressure receiver, tire pressure information of each tire can be constantly provided to drivers to facilitate drivers taking preventive measure upon encountering abnormal tire pressure.

To receive the signals transmitted from all wireless tire pressure meters, the wireless tire pressure receiver is equipped with a built-in antenna. As the size of the wireless tire pressure receiver is not sizable and the mounting position thereof is not fixed, the signal-receiving intensity may not be perfect. To enhance the signal-receiving intensity of a wireless tire pressure receiver, with reference to FIGS. 15 and 16, a conventional wireless tire pressure receiver has a box 1, an internal antenna 2, a circuit board 3, a socket 4 and a power cable 5. The internal antenna 2 is mounted inside the box 1. The circuit board 3 is mounted inside the box 1 to connect with the internal antenna 2. The socket 4 is mounted to one corner of the box 1. One end of the power cable 5 is mounted through the socket 4 to connect with a cigarette lighter of a vehicle and supply an operating power to the circuit board inside the box.

The antenna 2 extends to the socket 4. An external antenna 51 is sheathed by the power cable 5. The other end of the power cable 5 is plugged in the socket 4 through a plug 52 so as to form a power supply loop. The external antenna 51 is connected with the internal antenna 2 inside the wireless tire pressure receiver so as to extend the length of the internal antenna 2.

Such approach certainly improves the signal-receiving intensity of the wireless tire pressure receiver. However, as power wires and the antenna are both sheathed in the power cable and current flows through the power wires and the external antenna, electromagnetic interference therebetween is inevitable. Once interference occurs, normal operation of the wireless tire pressure receiver is affected.

Although using the power cable of the conventional wireless tire pressure receiver to sheath the antenna therein does extend length of the built-in antenna, an effective approach in eliminating electromagnetic interference needs to be further addressed.

SUMMARY OF THE INVENTION

An objective of the present invention is to provide an anti-interference antenna of a wireless tire pressure receiver enabling an antenna integrated into a power cable of the wireless tire pressure receiver against the interference from the power wires inside the power cable.

To achieve the foregoing objective, the anti-interference antenna of a wireless tire pressure receiver has an insulating cable, at least one power cable and an antenna.

The insulating cable has a main casing and a sub-casing. The main casing is insulating. The sub-casing is connected side by side with the main casing and is insulating.

Each of the at least one power cable is longitudinally mounted through the main casing and has at least one power wire.

The antenna is longitudinally mounted through the sub-casing.

As the antenna and the power cable are respectively sleeved by the sub-casing and main casing, the antenna and the power cable do not interfere with each other.

Preferably, the main casing has an oval section with a short height and a long width and has an inner edge and an outer edge, the sub-casing has a diameter equivalent to the short height of the main casing and is connected with the inner edge of the main casing, and the insulating cable further has at least one air channel and each of the at least one air channel is longitudinally formed through the main casing and is laterally adjacent to the inner edge of the main casing.

Preferably, the insulating cable further has at least one metal layer, and the at least one metal layer is mounted on an inner wall of a corresponding air channel.

Preferably, each of the at least one air channel is filled with an EMI-shielding matter.

The transversely elongated air channel built in the flat insulating cable for isolating the power cable and the antenna and the metal layer mounted on the inner wall of the air channel effectively prevents the antenna and the power cable from interfering with each other.

DETAILED DESCRIPTION OF THE INVENTION

Figure 1:
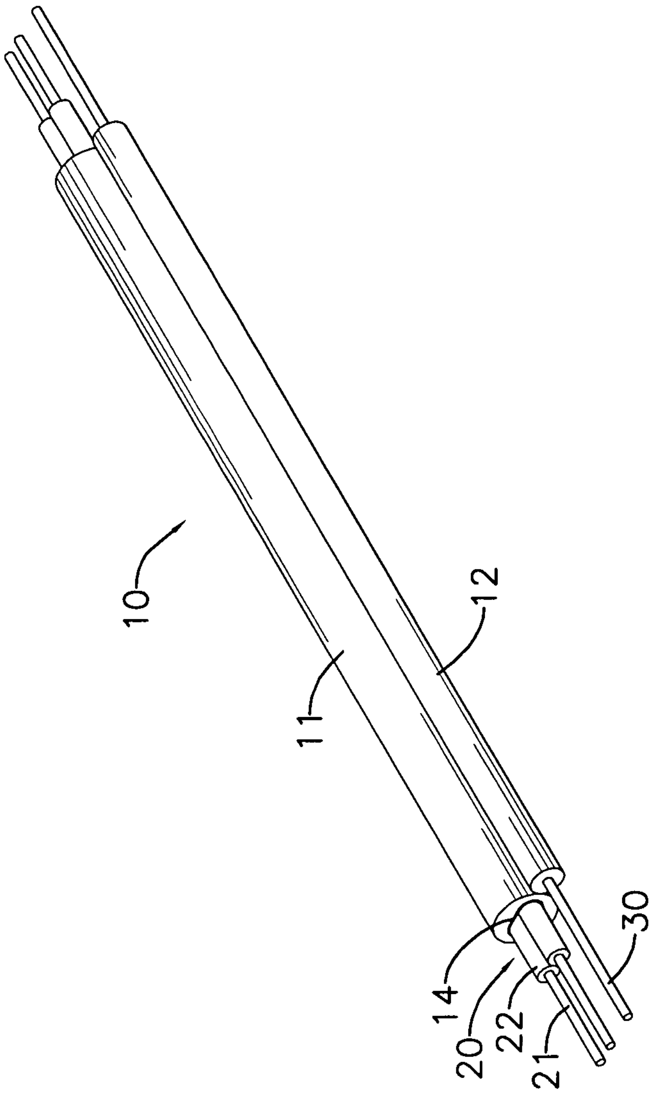
FIG. 1 is a perspective view of a first preferred embodiment of an anti-inference antenna of a wireless tire pressure receiver in accordance with the present invention.
Figure 2:
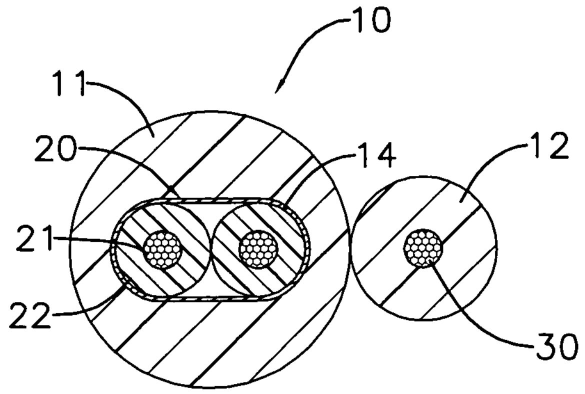
FIG. 2 is a first cross-sectional view of the anti-inference antenna of a wireless tire pressure receiver in FIG. 1.
Figure 3:
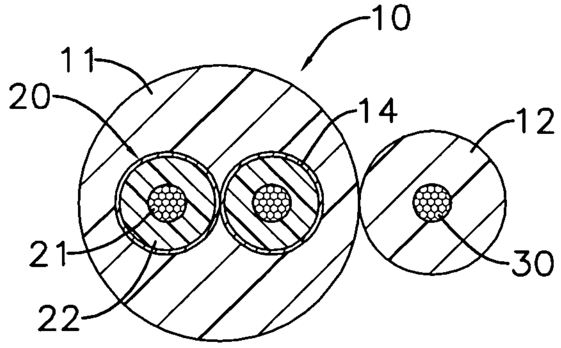
FIG. 3 is a second cross-sectional view of the anti-inference antenna of a wireless tire pressure receiver in FIG. 1.

With reference to FIGS. 1 to 3, a first embodiment of an anti-interference antenna of a wireless tire pressure receiver in accordance with the present invention has an insulating cable 10, at least one power cable 20 and an antenna 30.

The insulating cable 10 has a main casing 11, a sub-casing 12 and a metal layer 14. The sub-casing 12 is connected side by side with the main casing 11 and has a smaller diameter than that of the main casing 11. The main casing 11 and the sub-casing 12 are formed by an insulating material.

In the present embodiment, there is one power cable 20. The power cable 20 has at least one power wire 21. Each of the power wires has a cable core 21 covered by an insulating cable sheath 22. The power cable 20 is longitudinally mounted through the main casing 11. To implement the EMI-shielding capability of the main casing 11, the metal layer 14 may be mounted around the power cable 20 as shown in FIG. 2 or separated and mounted around each of the power wires as shown in FIG. 3. The antenna 30 is longitudinally mounted through the sub-casing 12.

As the antenna 30 is individually sleeved by the sub-casing 12 and the power cable is surrounded by the metal layer 14 and sheathed by the insulating main casing 11, interference between the power cable 20 and the antenna 30 can be effectively prevented.

Figure 4:
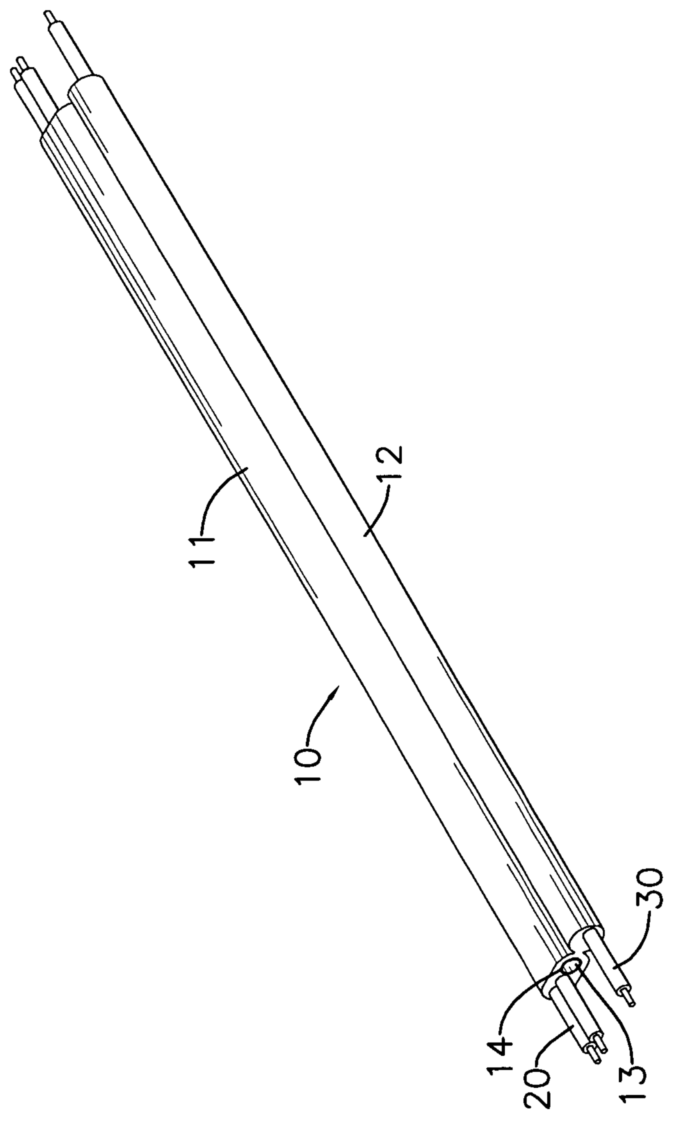
FIG. 4 is a perspective view of a second preferred embodiment of an anti-inference antenna of a wireless tire pressure receiver in accordance with the present invention.
Figure 5:
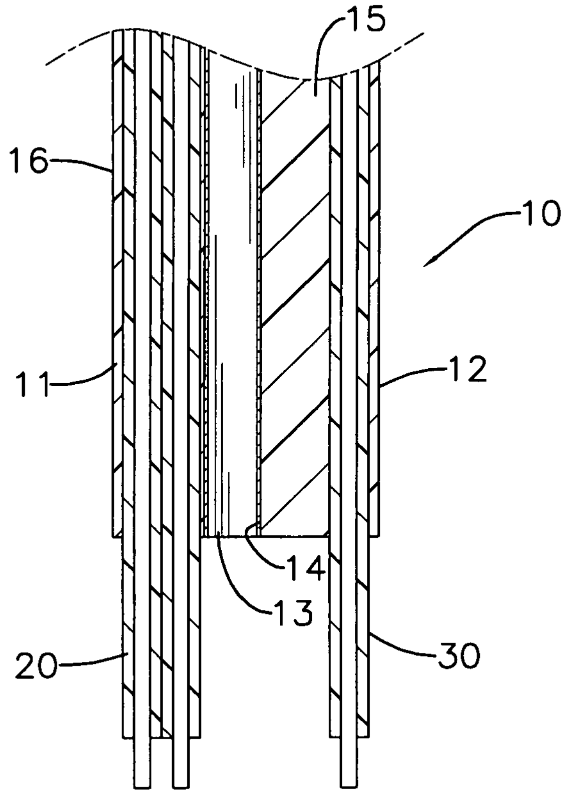
FIG. 5 is a first cross-sectional view of the anti-inference antenna of a wireless tire pressure receiver in FIG. 4.
Figure 6:
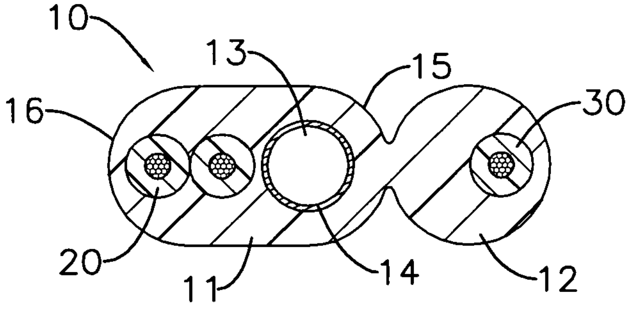
FIG. 6 is a second cross-sectional view of the anti-inference antenna of a wireless tire pressure receiver in FIG. 4.

With reference to FIGS. 4 to 6, a second embodiment of an anti-interference antenna of a wireless tire pressure receiver in accordance with the present invention has an insulating cable 10, at least one power cable 20 and an antenna 30.

The insulating cable 10 has a main casing 11, a sub-casing 12, at least one air channel 13 and at least one metal layer 14. The main casing 11 has an oval section with a short height and a long width, and has an inner edge 15 and an outer edge 16. The sub-casing 12 has a diameter equivalent to the short height of the main casing 11 and is connected side by side with the inner edge 15 of the main casing 11. Each of the at least one air channel 13 is longitudinally formed through the main casing 11 and is laterally adjacent to the inner edge 15 of the main casing 11. Each of the at least one metal layer 14 is mounted on an inner wall of the corresponding air channel 13.

In the second embodiment, there is only one air channel 13, one metal layer 14 and one power cable 20.

Figure 7:
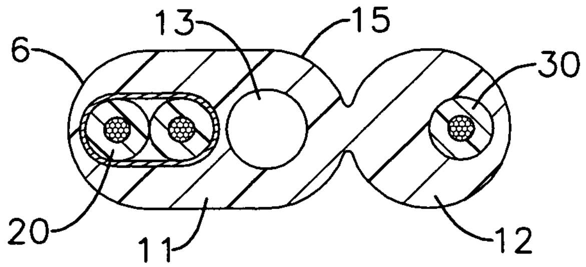
FIG. 7 is a third cross-sectional view of the anti-inference antenna of a wireless tire pressure receiver in FIG. 4.
Figure 8:
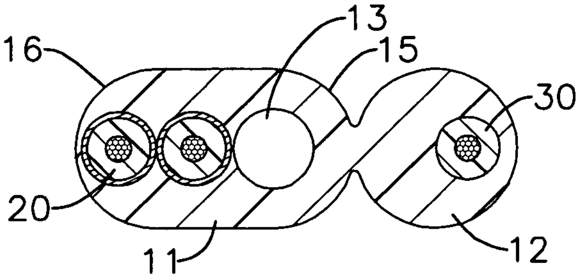
FIG. 8 is a fourth cross-sectional view of the anti-inference antenna of a wireless tire pressure receiver in FIG. 4.
Figure 9:
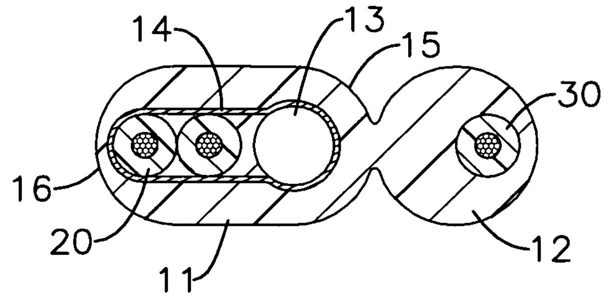
FIG. 9 is a fifth cross-sectional view of the anti-inference antenna of a wireless tire pressure receiver in FIG. 4.

The power cable 20 has at least one power wire and longitudinally mounted through the main casing 11, and is located between the outer edge 16 of the main casing 11 and the air channel 13. In the present embodiment, the power cable 20 has two power wires. With reference to FIG. 7, the metal layer 14 is mounted around a corresponding power cable 20. With reference to FIG. 8, the metal layer 14 is separated and mounted around each of the power wires. With reference to FIG. 9, the metal layer 14 is mounted around the corresponding power cable 20 and a corresponding air channel 13.

The antenna 30 is longitudinally mounted through the sub-casing 12 and is located eccentrically away from the inner edge 15 of the main casing 11.

Figure 10:
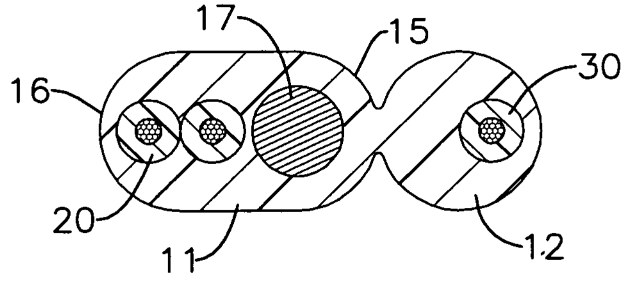
FIG. 10 is a sixth cross-sectional view of the anti-inference antenna of a wireless tire pressure receiver in FIG. 4.

Given the air channel 13 located between the power cable 20 and the antenna 30 and the metal layer 14 mounted on an inner wall of the air channel 13, around the power cable 20, around each of the power wires or around both the power cable 20 and the air channel 13, the power cable 20 and the antenna 30 are prevented from interfering with each other. With reference to FIG. 10, if filled with an EMI-shielding matter 17, the air channel 13 has better EMI-shielding capability.

Figure 11:
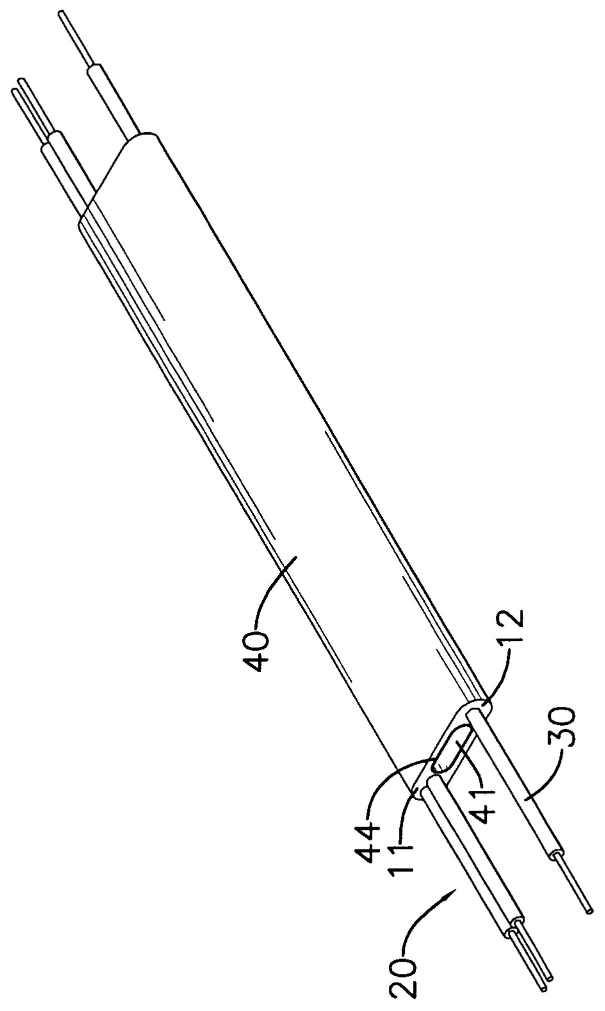
FIG. 11 is a perspective view of a third preferred embodiment of an anti-inference antenna of a wireless tire pressure receiver in accordance with the present invention.
Figure 12:
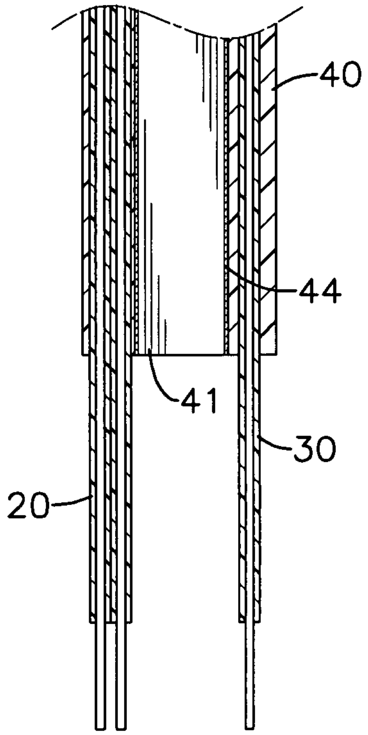
FIG. 12 is a first cross-sectional view of the anti-inference antenna of a wireless tire pressure receiver in FIG. 11.
Figure 13:
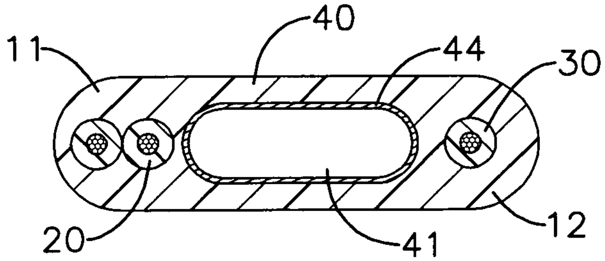
FIG. 13 is a second cross-sectional view of the anti-inference antenna of a wireless tire pressure receiver in FIG. 11.

With reference to FIGS. 11 to 13, a third embodiment of an anti-interference antenna of a wireless tire pressure receiver in accordance with the present invention has an insulating cable 40, at least one power cable 20 and an antenna 30.

The insulating cable 40 has a main casing 11, a sub-casing 12, at least one air channel 41, and at least one metal layer 44. The insulating cable 40 is integrally formed by the main casing 11 and the sub-casing 12 to take a flat form. Each of the air channel 41 is transversely elongated, and is longitudinally formed through the insulating cable 40 and between the main casing 11 and the sub-casing 12.

In the third embodiment, there is one air channel 41, one metal layer 44 and one power cable 20.

Figure 14:
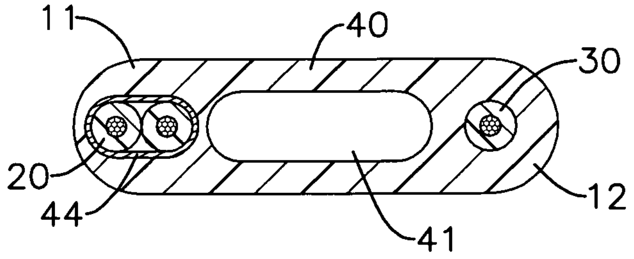
FIG. 14 is a third cross-sectional view of the anti-inference antenna of a wireless tire pressure receiver in FIG. 11.
Figure 15:
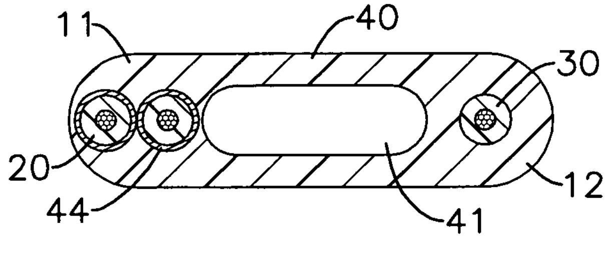
FIG. 15 is a fourth cross-sectional view of the anti-inference antenna of a wireless tire pressure receiver in FIG. 11.
Figure 16:
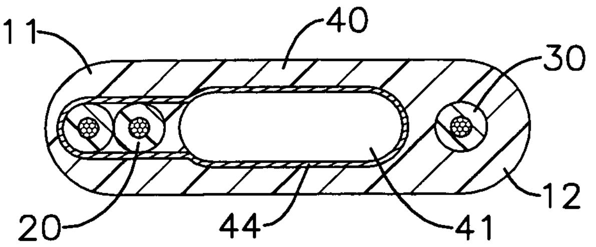
FIG. 16 is a fifth cross-sectional view of the anti-inference antenna of a wireless tire pressure receiver in FIG. 11.
Figure 17:
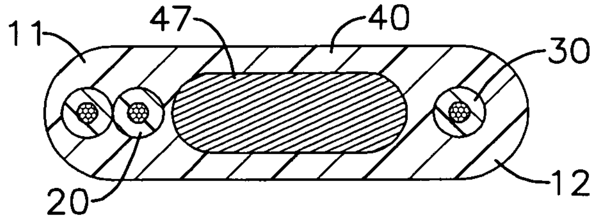
FIG. 17 is a sixth cross-sectional view of the anti-inference antenna of a wireless tire pressure receiver in FIG. 11.
Figure 18:
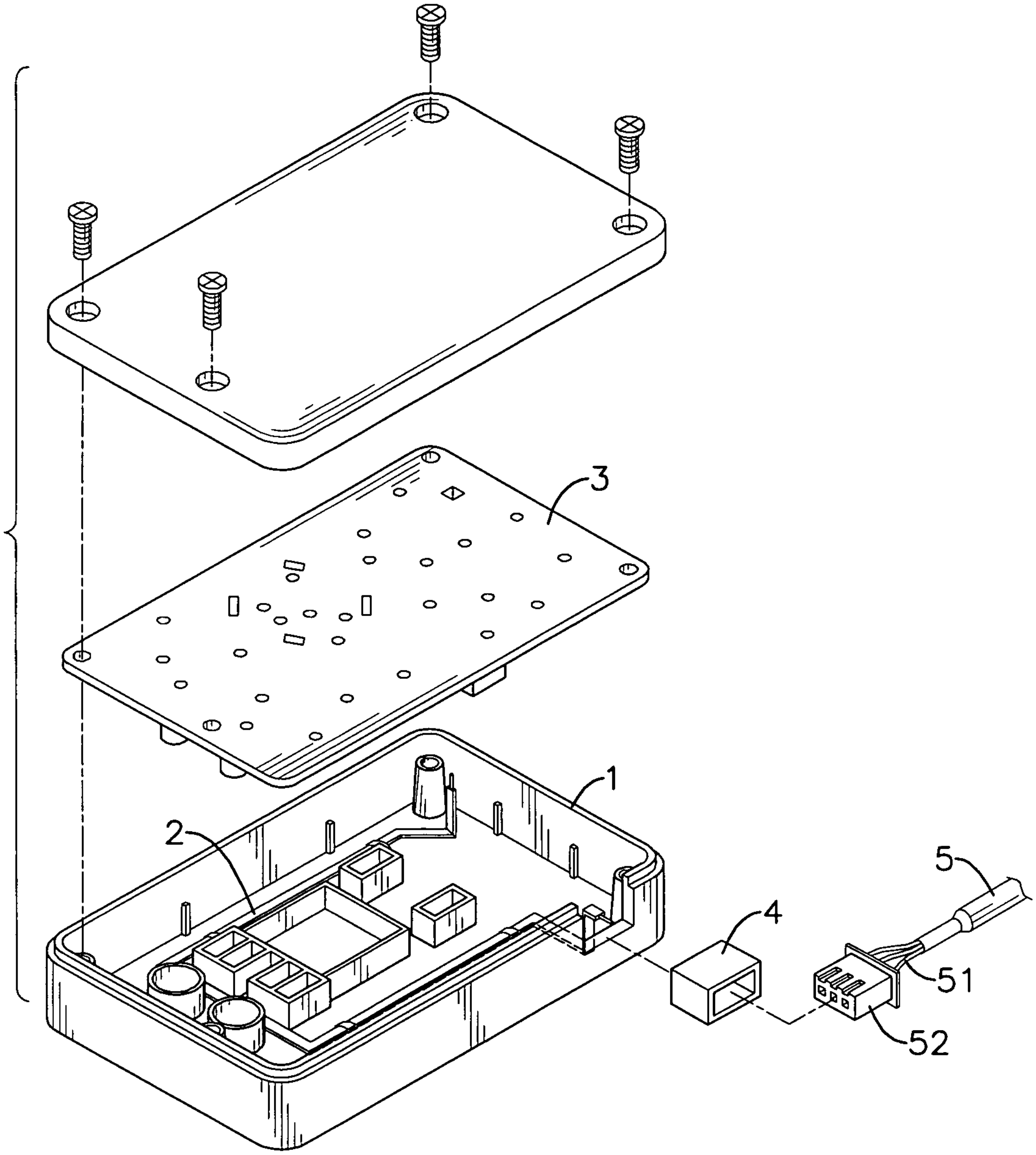
FIG. 18 PRIOR ART
FIG. 18 is an exploded perspective view of a conventional wireless tire pressure receiver.
Figure 19:
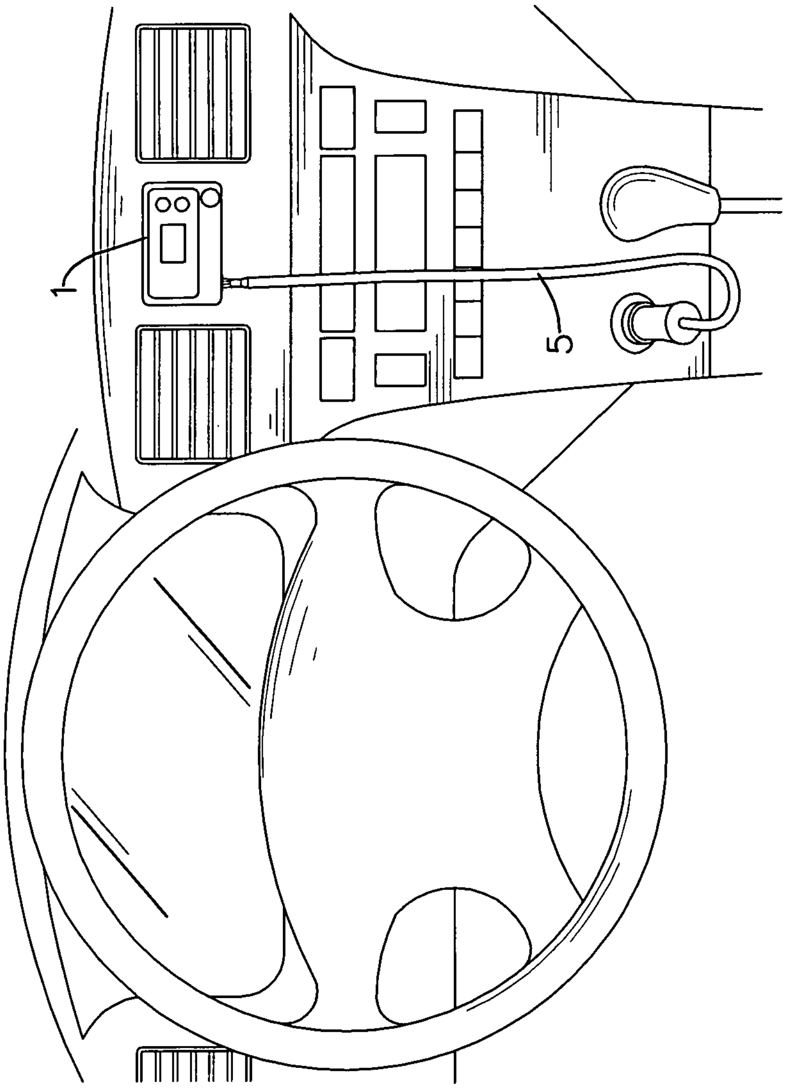
FIG. 19 PRIOR ART
FIG. 19 is a schematic view of the conventional wireless tire pressure receiver mounted in a vehicle.

The power cable 20 has at least one power wire and is longitudinally mounted through the main casing 11 of the insulating cable 40. The antenna 30 is longitudinally mounted through the sub-casing 12 of the insulating cable 40. Therefore, the power cable 20 and the antenna 30 are formed beside and isolated by the at least one air channel 41. The metal layer 44 is mounted on an inner wall of the air channel 41. With reference to FIG. 14, the metal layer 44 is mounted around the power cable 20. With reference to FIG. 15, the metal layer 44 is mounted around each of the power wires. With reference to FIG. 16, the metal layer 44 is mounted around both the power cable 20 and the air channel 41.

As the at least one air channel 41 is located between the power cable 20 and the antenna 30 and the metal layer 44 is mounted on an inner wall of the air channel 41, around the power cable 20, around each of the power wires, or around the power cable 20 and the air channel 41, the power cable 20 and the antenna 30 are prevented from interfering with each other. With reference to FIG. 10, if filled with an EMI-shielding matter 47, the air channel 41 has better EMI-shielding capability.

When the conventional power cable of a wireless tire pressure receiver is replaced by the antennas of the foregoing embodiments, the power cable and the antenna are respectively connected with a power input terminal and an embedded antenna inside the wireless tire pressure receiver. The signal receiving intensity of the embedded antenna can be improved through the antenna, and no mutual interference incurs between the antenna and the power cable. Besides the aforementioned application, the antenna of the present invention can be directly connected to the wireless tire pressure receiver to serve as a reception antenna thereof. In other words, the wireless tire pressure receiver is unnecessarily built in with an antenna, thereby reducing cost and saving space inside the receiver.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An anti-inference antenna of a wireless tire pressure receiver, comprising:

an insulating cable comprising:

a main casing being insulating; and a sub-casing connected side by side with the main casing and being insulating;

a power cable longitudinally mounted through the main casing and having at least one power wire; and an antenna longitudinally mounted through the sub-casing.

2. The anti-interference antenna as claimed in claim 1, wherein the main casing has an oval section with a short height and a long width, and has an inner edge and an outer edge;

the sub-casing has a diameter equal to the short height of the main casing and is connected side by side with the inner edge of the main casing; and the insulating cable further comprises an air channel longitudinally formed through the main casing and being laterally adjacent to the inner edge of the main casing.

3. The anti-interference antenna as claimed in claim 2, wherein the insulating cable is integrally formed by the main casing and the sub-casing to take a flat form, and further comprises an air channel transversely elongated and longitudinally formed through the insulating cable and located between the main casing and the sub-casing so that the power cable and the antenna are formed beside and isolated by the air channel.

4. The anti-interference antenna as claimed in claim 1, wherein the insulating cable further comprises a metal layer mounted around the power cable.

5. The anti-interference antenna as claimed in claim 2, wherein the insulating cable further comprises a metal layer mounted on an inner wall of the air channel.

6. The anti-interference antenna as claimed in claim 2, wherein the insulating cable further comprises a metal layer mounted around the power cable.

7. The anti-interference antenna as claimed in claim 2, wherein the insulating cable further comprises at least one metal layer, each of the at least one metal layer is mounted around one of the at least one power wire of the power cable.

8. The anti-interference antenna as claimed in claim 2, wherein the insulating cable further comprises a metal layer mounted around the power cable and the air channel.

9. The anti-interference antenna as claimed in claim 3, wherein the insulating cable further comprises a metal layer mounted on an inner wall of the air channel.

10. The anti-interference antenna as claimed in claim 3, wherein the insulating cable further comprises a metal layer mounted around the power cable.

11. The anti-interference antenna as claimed in claim 3, wherein the insulating cable further comprises at least one metal layer, each of the at least one metal layer is mounted around one of the at least one power wire of the power cable.

12. The anti-interference antenna as claimed in claim 3, wherein the insulating cable further comprises a metal layer, mounted around the power cable and the air channel.

13. The anti-interference antenna as claimed in claim 2, wherein the air channel is filled with an EMI-shielding matter.

14. The anti-interference antenna as claimed in claim 3, wherein the air channel is filled with an EMI-shielding matter.

15. The anti-interference antenna as claimed in claim 5, wherein the air channel is filled with an EMI-shielding matter.

16. The anti-interference antenna as claimed in claim 6, wherein the air channel is filled with an EMI-shielding matter.

17. The anti-interference antenna as claimed in claim 7, wherein the air channel is filled with an EMI-shielding matter.

18. The anti-interference antenna as claimed in claim 8, wherein the air channel is filled with an EMI-shielding matter.

19. The anti-interference antenna as claimed in claim 9, wherein the air channel is filled with an EMI-shielding matter.

20. The anti-interference antenna as claimed in claim 10, wherein the air channel is filled with an EMI-shielding matter.

21. The anti-interference antenna as claimed in claim 11, wherein the air channel is filled with an EMI-shielding matter.

22. The anti-interference antenna as claimed in claim 12, wherein the air channel is filled with an EMI-shielding matter.

* * * * *